(12) United States Patent
Chen et al.

(10) Patent No.: US 8,573,091 B2
(45) Date of Patent: Nov. 5, 2013

(54) COMPLIANT MECHANISM

(75) Inventors: Che-Chien Chen, Taichung (TW);
Tzu-Min Yi, Pingtung County (TW);
I-Ping Chang, Changhua County (TW);
Cheng-Wei Tung, Taichung (TW)

(73) Assignee: Precision Machinery Research Development Center, Taichung (TW)

( * ) Notice: Subject to any disclaimer, the term of this patent is extended or adjusted under 35 U.S.C. 154(b) by 305 days.

(21) Appl. No.: 13/219,811

(22) Filed: Aug. 29, 2011

(65) Prior Publication Data
US 2012/0266711 A1 Oct. 25, 2012

(51) Int. Cl.
*B25J 17/00* (2006.01)
*B25J 17/02* (2006.01)
*B25J 18/00* (2006.01)
*F16H 1/16* (2006.01)
*F16H 1/20* (2006.01)
*F16F 1/14* (2006.01)
*F16D 1/12* (2006.01)
*F16D 3/10* (2006.01)

(52) U.S. Cl.
USPC ............ 74/490.05; 74/425; 901/28; 267/154; 464/160

(58) Field of Classification Search
USPC ........... 74/411, 425, 425.5, 426, 427, 490.05; 267/141.2, 150, 154; 464/160
See application file for complete search history.

(56) References Cited

U.S. PATENT DOCUMENTS

| 3,129,571 | A | * | 4/1964 | Reynolds | 464/97 |
| 4,795,403 | A | * | 1/1989 | Heine et al. | 464/77 |
| 4,983,143 | A | * | 1/1991 | Sekine et al. | 464/89 |
| 5,149,305 | A | * | 9/1992 | Gordon | 474/101 |
| 5,443,247 | A | * | 8/1995 | Polites et al. | 267/283 |
| 5,692,410 | A | * | 12/1997 | Fenelon | 74/411 |
| 5,873,786 | A | * | 2/1999 | Hosoya et al. | 464/73 |
| 5,876,287 | A | * | 3/1999 | Barickman | 464/82 |
| 5,931,737 | A | * | 8/1999 | Aota et al. | 464/89 |
| 5,943,913 | A | * | 8/1999 | Fenelon | 74/411 |
| 7,650,819 | B2 | * | 1/2010 | Haynes et al. | 74/606 R |
| 8,021,071 | B2 | * | 9/2011 | Shim et al. | 403/328 |
| 8,215,606 | B2 | * | 7/2012 | Haynes et al. | 248/635 |

* cited by examiner

Primary Examiner — Troy Chambers
Assistant Examiner — Michael Gonzalez
(74) Attorney, Agent, or Firm — Bacon & Thomas, PLLC

(57) ABSTRACT

A compliant mechanism includes a first unit, a second unit, at least one elastic member and a driver for driving the elastic member to rotate through a predetermined angle. The first and second units collectively define a passage about which the second unit is rotatable relative to the first unit. The elastic member has a plate and first and second shafts which are coaxially connected to two opposite ends of the plate respectively and rotatably connected with the first and second units respectively. The elastic member is rotatable about a co-axis of the first and second shafts and elastically deformable when the second unit rotates relative to the first unit. The elastic member can change its resistance to the rotation of the second unit by rotating; therefore the compliant mechanism has a great safety upon receiving load and is widely applicable in many fields.

10 Claims, 5 Drawing Sheets

COMPLIANT MECHANISM

BACKGROUND OF THE INVENTION

1. Field of the Invention

The present invention relates generally to compliant mechanisms and more particularly, to a compliant mechanism which is modularized and widely applicable in many fields.

2. Description of the Related Art

Service robots are developed quickly in recent years not only in function but even safety. In particular, when the robots contact, interact, and serve users, any potential injury done by the robots to the users should be avoided. Therefore, compliant mechanisms, which have the advantages of quick response and none of any damageable electronic components, have been applied in the robots to absorb and buffer the shock resulting from the external force so as to upgrade the safety of the robots.

Specifically speaking, the compliant mechanisms can be installed in the joints of the robot or the robot's loading parts for contact with the users or loading things. When the robot is about to receive a large load, the rigidity of the corresponding compliant mechanism is raised. When the robot is about to receive a small load or contact the users or fragile things, the rigidity of the corresponding compliant mechanism is lowered. As a result, the robot can function safely.

However, the conventional compliant mechanisms have specific configurations, complicated structures, or big sizes and it is difficult to modify them according to different applications. In other words, the conventional compliant mechanisms are still defective to need further improvement.

SUMMARY OF THE INVENTION

The present invention has been accomplished in view of the above-noted circumstances. It is an objective of the present invention to provide a compliant mechanism which has a modularized and hollow structure to result in a wide applicability.

To attain the above objective, the present invention provides a compliant mechanism which comprises a first unit, a second unit rotatably connected with the first unit, at least one elastic member and a driver for driving the elastic member to rotate. The first unit and the second unit collectively define a passage. The elastic member has a plate and first and second shafts which are coaxially connected to two opposite ends of the plate respectively and rotatably connected with the first unit and the second unit respectively so that the elastic member is rotatable about a co-axis of the first shaft and the second shaft, and the direction about which the elastic member rotates intersects the direction about which the second unit rotates. When the second unit rotates relative to the first unit, the elastic member is elastically deformed.

As a result, the driver can drive the elastic member to rotate about the co-axis of the first and second shafts through a predetermined angle to change the angle of the plate relative to the direction about which the second unit rotates so as to adjust the resistance of the elastic member to the rotation of the second unit relative to the first unit. Therefore, the rigidity of the compliant mechanism will vary with the posture of the elastic member. When the mechanism is set in a low rigidity manner, the elastic member can absorb an external force, which makes the second unit rotate, to avoid the device carrying the mechanism from damaging the things or the users contacting the device. When the mechanism is set in a high rigidity manner, the elastic member can resist the external force to enable the device to receive a large load, such as the load of carrying heavy things.

Besides, the direction about which the elastic member rotates may intersect the direction about which the second unit rotates for providing a good effect on the adjustment of the resistance of the elastic member. Preferably, the direction about which the elastic member rotates is perpendicular to the direction about which the second unit rotates for providing an optimum effect on the resistance adjustment.

The compliant mechanism provided by the present invention is modularized, so that only parts of the first and second units might need some modifications to adapt the mechanism to different environments and devices, which means the mechanism is widely applicable in many fields. Besides, the mechanism is hollow and provided with the passage to facilitate installation of electric wires therethrough, which causes more convenience to dispose the wires and more flexibility to design the configuration of a product having the mechanism.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
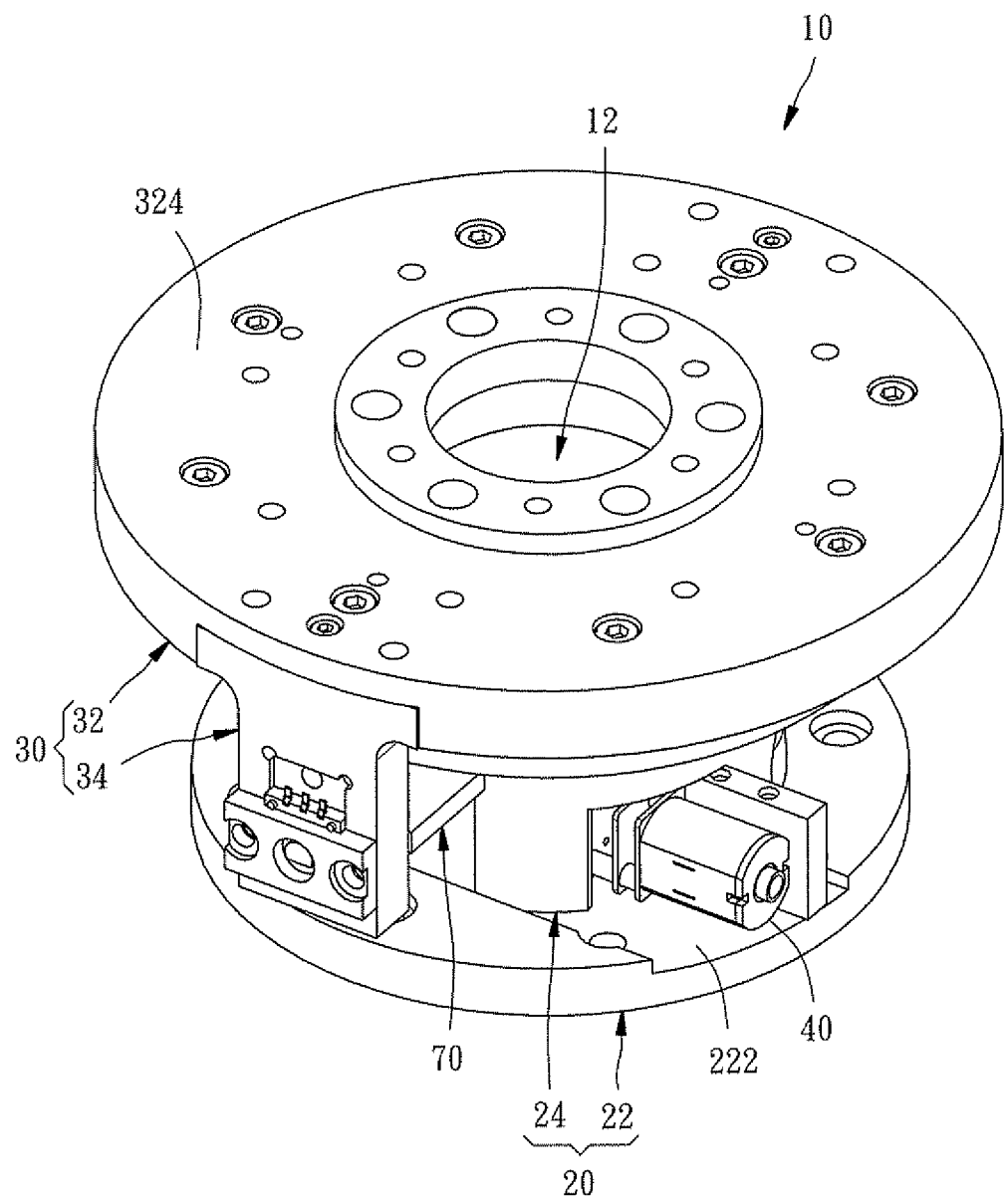
FIG. 1 is an assembled perspective view of a compliant mechanism according to a preferred embodiment of the present invention.
Figure 2:
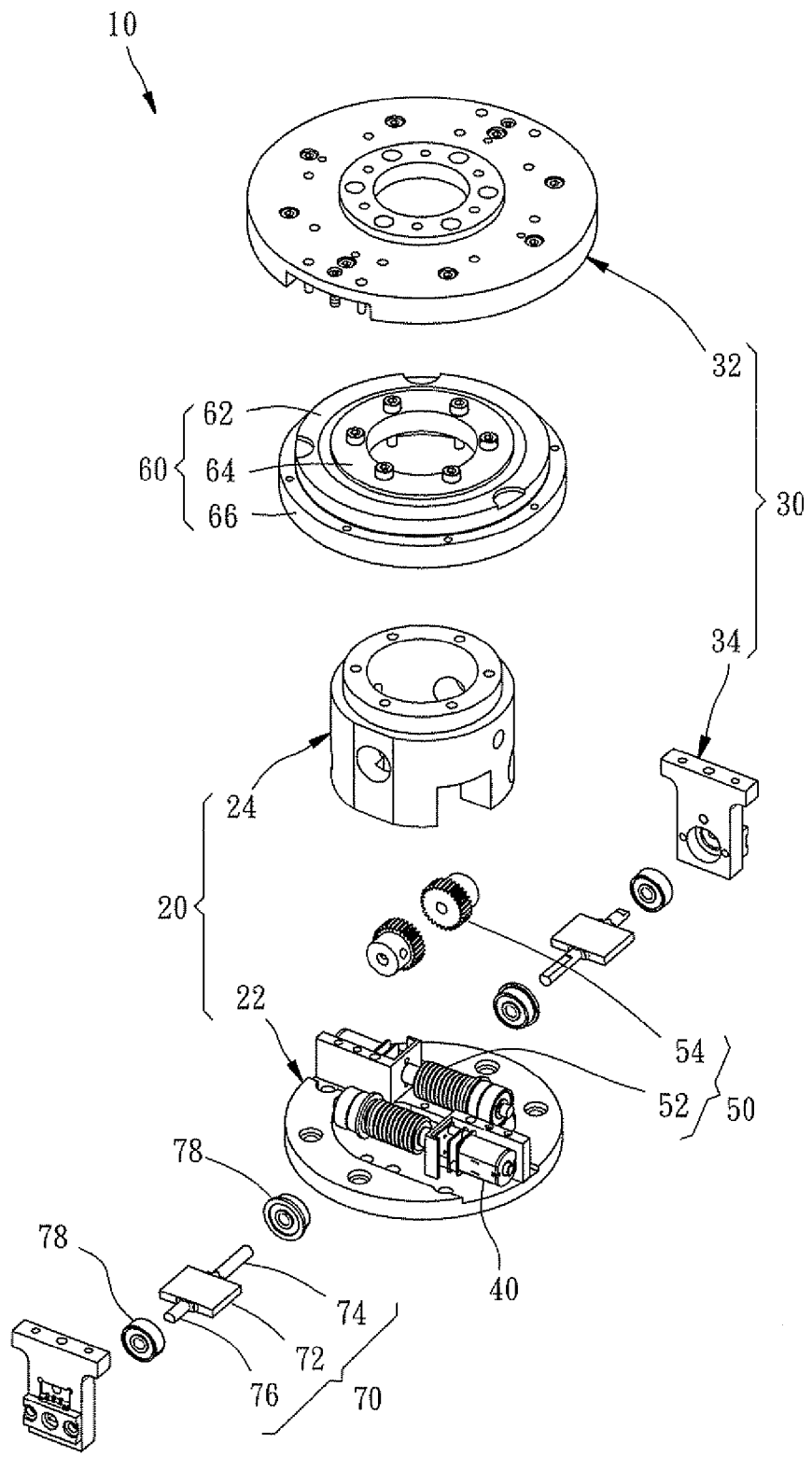
FIG. 2 is an exploded perspective view of the compliant mechanism of the preferred embodiment of the present invention.
Figure 3:
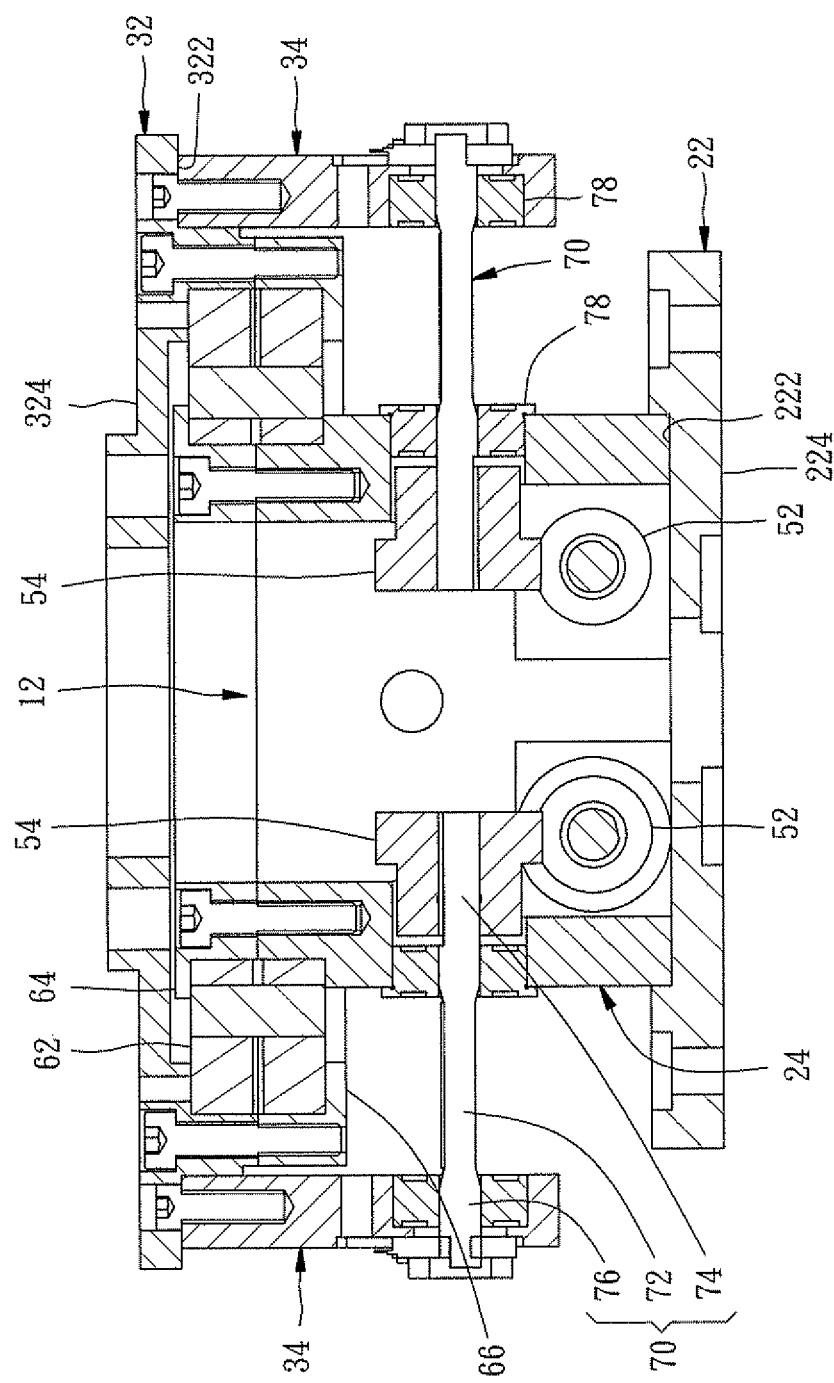
FIG. 3 is a sectional view of the compliant mechanism of the preferred embodiment of the present invention.

As shown in FIGS. 1-3, a compliant mechanism 10, which is provided by a preferred embodiment of the present invention, comprises a first unit 20, a second unit 30, two drivers 40, two transmission subassemblies 50, a bearing subassembly 60 and two elastic members 70.

The first unit 20 primarily comprises a base 22 and a tube 24. The base 22 is provided with an inward side 222 facing the second unit 30 and an outward side 224 facing the outside of the mechanism 10. The drivers 40, which are motors, are fastened to the inward side 222 of the base 22 and connected with the transmission subassemblies 50 respectively. Each transmission subassembly 50 has a worm 52 connected with the driver 40 and a worm gear 54 engaged with the worm 52.

The transmission subassemblies 50 are located inside the tube 24 which is fastened to the inward side 222 of the base 22.

The second unit 30 comprises a disk 32 and two connectors 34. The disk 32 is provided with an inward side 322 facing the first unit 20 and an outward side 324 facing the outside of the mechanism 10. The connectors 34 are fastened to the inward side 322 of the disk 32 in proximity of the periphery edge of the disk 32. The tube 24 is located between the connectors 34.

The bearing subassembly 60 comprises a first bearing 62, which is a crossed roller bearing in the embodiment and can be replaced by one or more other kinds of bearings according to different situations, an inner collar 64 and an outer collar 66 fixed at an inner rim and an outer rim of the first bearing 62 respectively in a tight fit manner and fastened to the tube 24 and the disk 32 respectively by bolts. Because the disk 32, the bearing subassembly 60 and the first unit 20 are hollow and aligned orderly, the mechanism 10 is provided with a passage 12 penetrating the first unit 20 and the second unit 30. As a result, the second unit 30 is rotatable about the passage 12 relative to the first unit 20.

Each elastic member 70 has a plate 72, a first shaft 74 and a second shaft 76, which are coaxially connected to two opposite ends of the plate 72 respectively. The first shafts 74 of the elastic members 70, each of which rotatably penetrates through the tube 24 by means of a second bearing 78, are fixed at the centers of the worm gears 54 respectively. Each of the second shafts 76 of the elastic members 70 is rotatably disposed at one of the connectors 34 by means of a second bearing 78. As a result, the drivers 40 can respectively drive the elastic members 70 to rotate about a co-axis of their own first and second shafts 74 and 76, which are coaxial with each other and perpendicular to the passage 12. In other words, the direction about which the drivers 40 drive the elastic members 70 to rotate is perpendicular to the direction about which the second unit 30 rotates.

It is to be understood the design that the rotation axis of the elastic members 70 perpendicularly intersects the rotation axis of the second unit 30 is just an optimum solution. As long as the elastic members 70 are rotatable to change their posture, the resistance provided by the elastic members 70 against the rotation movement of the second unit 30 is adjustable.

Figure 4:
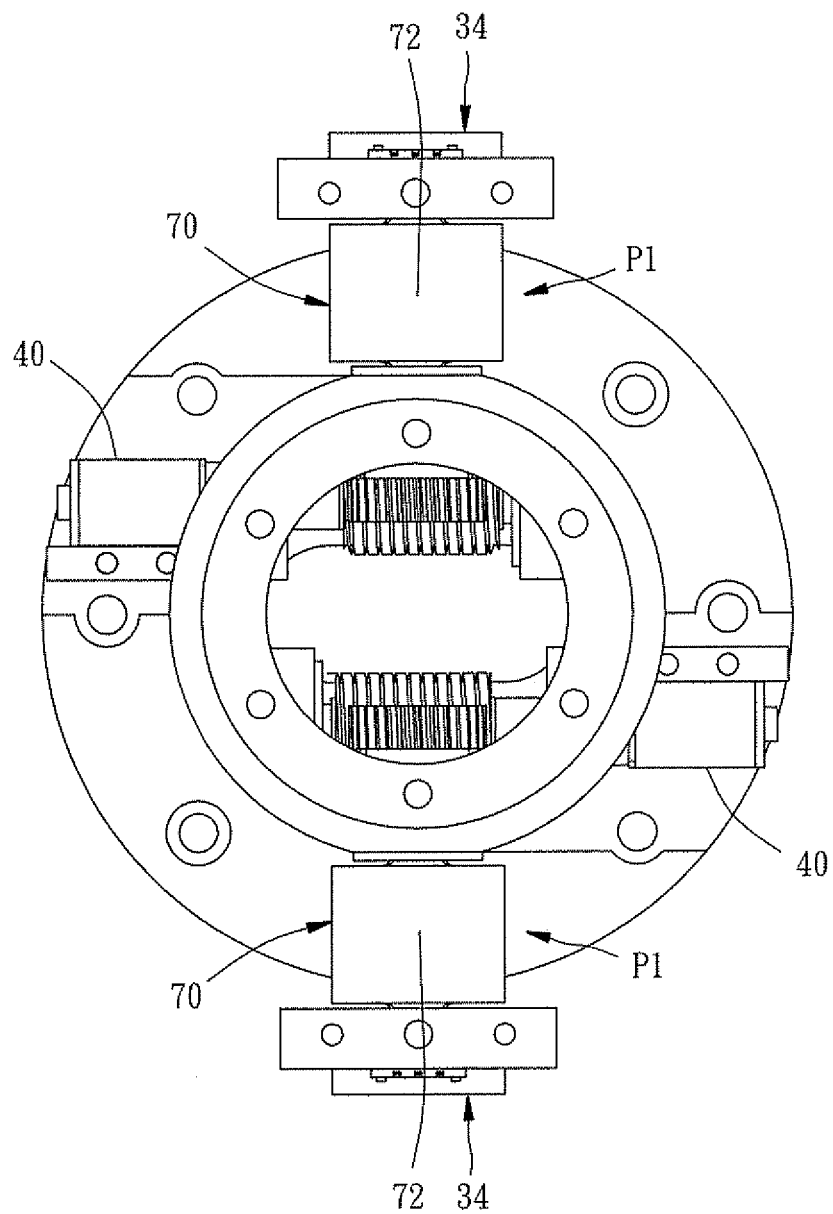
FIG. 4 is a top view of the compliant mechanism of the preferred embodiment of the present invention, wherein a disk and a bearing subassembly of the compliant mechanism are not shown for the convenience of illustration.
Figure 5:
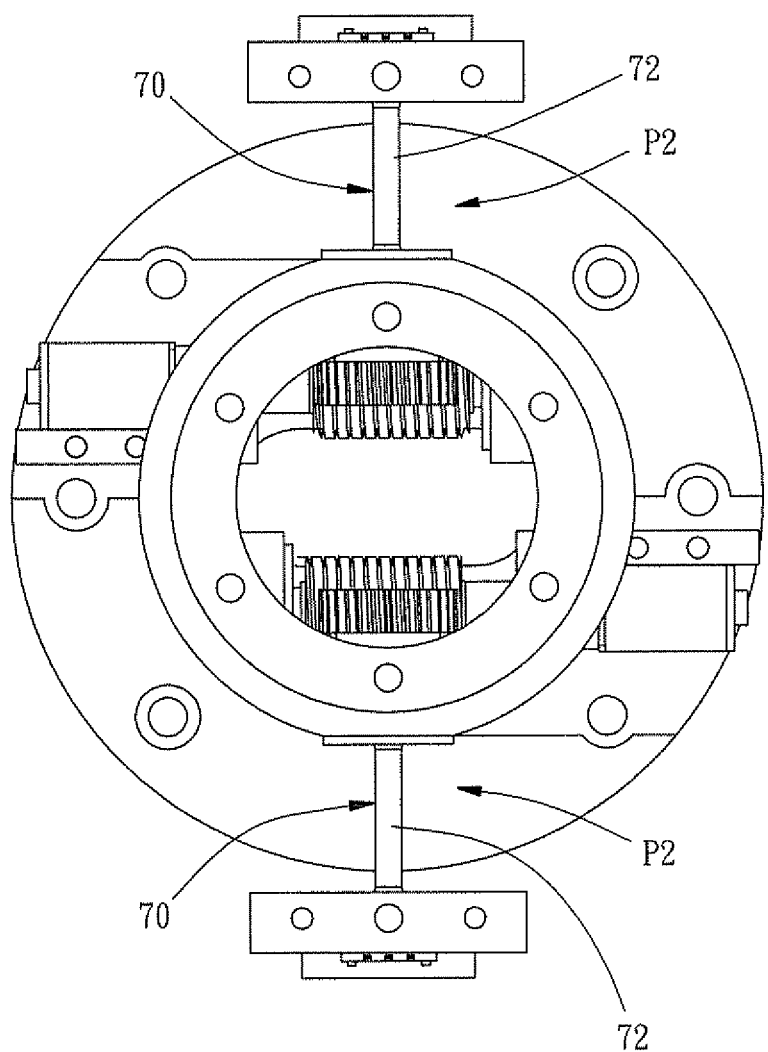
FIG. 5 is similar to FIG. 4, but showing that the two elastic members of the compliant mechanism are turned through 90 degrees.

In aforesaid compliant mechanism 10 provided by the present invention, the elastic members 70 can be driven by the drivers 40 to rotate between a maximum resistance position P1 (as shown in FIG. 4) and a minimum resistance position P2 (as shown in FIG. 5). In other words, the resistance of the elastic members 70 to the rotation of the second unit 30 is adjustable by changing the angles of the plates 72 relative to the rotation axis of the second unit 30, and the rigidity of the mechanism 10 will vary with the aforesaid resistance. When the mechanism 10 is set in a low rigidity state, such as the elastic members 70 are driven to the minimum resistance position P2, the elastic members 70 can absorb an external force, which makes the second unit 30 rotate, by elastic deformation so as to avoid a device (not shown) carrying the mechanism 10 from damaging the things or the users contacting the device.

When the mechanism 10 is set in a high rigidity state, such as the elastic members 70 are driven to the maximum resistance position P1, the elastic members 70 can resist the external force to be hardly deformed, such that the device carrying the mechanism 10 can receive a great load, such as the load of carrying heavy things.

It is more important that the compliant mechanism 10 provided by the present invention only requires slight modifications in the shapes of the disk 32 and the base 22 to adapt different environments and devices. This feature means the mechanism 10 is widely applicable in many fields. Besides, because the mechanism 10 has the passage 12 that facilitates arrangement of electric wires, the configuration design of a product having the mechanism 10 is more flexible.

It should be appreciated that each transmission subassembly 50 is arranged to cause speed reduction between the driver 40 and the elastic member 70. The transmission subassembly 50 introduced in this embodiment, which consists of a worm and a worm gear, not only makes the rotation axis of the elastic member 70 perpendicular to the rotation axis of the output shaft of the driver 40 but also has the characteristics of high speed reduction ratio and irreversible transmission direction. The drivers 40 can be servo motors that can do optimal adjustments on the resistance of the elastic members 70 quickly. However, the driver 40 and the transmission subassembly 50 are not limited to a servo motor and the combination of a worm and a worm gear. Besides, although two elastic members 70 positioned opposite to each other can make the mechanism 10 more balanced while receiving an external force, the major characteristic of the elastic members 70 is the adjustable resistance, so the amount of the elastic members 70 is not limited. Furthermore, because of having a hollow structure like a tube as a whole, the mechanism 10 is convenient in arranging electronic wires and is widely applicable in many fields. However, the details of the hollow structure are not limited to those provided by the preferred embodiment of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A compliant mechanism comprising:
    a first unit;
    a second unit rotatably connected with the first unit, the first unit and the second unit collectively defining a passage;
    at least one elastic member having a plate, and first and second shafts which are coaxially connected to two opposite ends of the plate respectively and rotatably connected with the first unit and the second unit respectively, so that the elastic member is rotatable about a co-axis of the first shaft and the second shaft and elastically deformed when the second unit rotates relative to the first unit; and
    a driver for driving the elastic member to rotate through a predetermined angle.

2. The compliant mechanism as claimed in claim 1, wherein the first shaft of the elastic member is connected with a worm gear, and the worm gear is engaged with a worm which is connected with the driver.

3. The compliant mechanism as claimed in claim 1, wherein the second unit is rotatable about the passage relative to the first unit.

4. The compliant mechanism as claimed in claim 1, further comprising a bearing, an inner collar fixed at an inner rim of the bearing and connected with the first unit, and an outer collar fixed at an outer rim of the bearing and connected with the second unit.

5. The compliant mechanism as claimed in claim 1, wherein the second unit comprises a disk provided with an inward side facing the first unit, and at least one connector attached to the inward side of the disk; the second shaft of the elastic member is rotatably disposed at the connector.

6. The compliant mechanism as claimed in claim 1, wherein the first unit comprises a base provided with an inward side facing the second unit, and a tube attached to the inward side of the base; the driver is disposed on the base.

7. The compliant mechanism as claimed in claim 1, wherein the direction about which the elastic member rotates intersects the direction about which the second unit rotates.

8. The compliant mechanism as claimed in claim 7, wherein the direction about which the elastic member rotates is perpendicular to the direction about which the second unit rotates.

9. The compliant mechanism as claimed in claim 1, comprising two said elastic members, the first shafts and the second shafts of which are coaxial with each other.

10. The compliant mechanism as claimed in claim 9, wherein the second unit comprises a disk provided with an inward side facing the first unit, and two connectors attached to the inward side of the disk; the first unit comprises a base provided with an inward side facing the second unit, and a tube attached to the inward side of the base and located between the connectors; the second shafts of said two elastic members are rotatably disposed at the connectors respectively; the first shafts of said two elastic members penetrate into the tube in a way that each of the first shafts is driven to rotate by one said driver through a transmission subassembly.

* * * * *